Patented Nov. 5, 1935

2,020,171

UNITED STATES PATENT OFFICE 2,020,171

CAST IRON AND THE MANUFACTURE THEREOF

William A. Brown, Connellsville, Pa., assignor to The Carborundum Company, Niagara Falls, N. Y., a corporation of Pennsylvania No Drawing. Application July 10, 1933, Serial No. 679,715

10 Claims. (Cl. 75—45)

This invention relates to the production of cast iron, and more particularly to a variety of grey iron having certain desirable physical characteristics. The material made in accordance with the invention is adapted for many uses, but has been found especially suitable for enamelling and for the production of castings which must subsequently be machined.

Grey cast iron, as is well known, contains a large amount of free graphite, and also a very substantial percentage by volume of other constituents such as iron carbide and iron phosphide. The properties of the iron depend to a large extent upon the relative amount and distribution of these undissolved constituents, and particularly upon the proportion and distribution of the free and combined carbon. One of the features of this invention is that it makes possible a very desirable distribution of these constituents and that it affords a stabilized pearlitic structure over widely varying rates of cooling.

Another important advantage of the invention is that it makes possible the production of machinable castings from charges containing very high percentages of scrap. In many instances I have found it possible to remelt mixtures consisting entirely of scrap and to obtain a better quality of iron than is ordinarily produced when a substantial proportion of pig iron is added to the charge.

In my process of producing cast iron, I add silican carbide to the molten metal. I have found that the addition of a relatively small amount of silicon carbide greatly alters the properties of the resulting castings, especially when the original charge contains a high percentage of scrap. When the silicon carbide goes into solution a vigorous exothermic reaction occurs which increases the pouring temperature of the iron and produces a corresponding increase in the fluidity of the metal and the soundness of the castings. The addition of silicon carbide also makes possible the melting of the iron and the attainment of high pouring temperatures with the use of a relatively small ratio of coke to metal, so that mixtures of scrap relatively high in sulphur can be remelted without increasing the sulphur content of the iron to a point where it has a deleterious effect upon the structure of the castings.

I do not fully understand the exact reaction which occurs between the silicon carbide and the cast iron, but believe that a large amount of the heat liberated may be due to the heat of solution of the silicon carbide in the molten metal. When the silicon carbide is broken up the silicon and carbon dissolve in the iron, and these elements being in the nascent state are capable of producing effects which are not produced by the addition of ferro silicon or coke. The effect is not entirely one of deoxidation, as the silicon carbide added will produce an increase in the silicon and carbon contents of the iron.

In using silicon carbide in connection with the cupola melting of iron, I prefer to add the silicon carbide directly to the charge when the latter is introduced into the cupola, and I have also found it advantageous to briquette the silicon carbide so as to maintain it in lump form until it reaches the slag zone of the cupola. As an alternative method, the silicon carbide can be mixed with water to form a slurry or paste, and the desired quantity can be thrown into the cupola with the introduction of the charge. When the silicon carbide is properly briquetted, it remains intact until it reaches the slag zone, whereupon it is disintegrated and the greater part of the silicon carbide apparently goes into solution in the molten iron with a vigorous evolution of heat. There also may be some partial or preliminary solution in the slag, as I have found that proper slagging conditions are of great importance in effecting the solution of the silicon carbide.

In carrying out my process, any form of silicon carbide of a reasonable degree of fineness can be employed. For example, I may use dust collector fines, settling tank fines, or finely divided silicon carbide of the type used for refractories. This latter grade of silicon carbide is usually somewhat less pure than that used for abrasives, and is consequently cheaper than the very pure crystalline material. I may also use the material known commercially as "fire sand", which is a product of the silicon carbide furnace and has a silicon carbide content of approximately 85 per cent. Scrap abrasive wheels made from silicon carbide grain can also be used, since the bonds used in making the abrasive will dissolve in the slag, thus permitting the reaction between the silicon carbide and the molten iron. When dust collector fines or settling tank fines are employed, it is in some instances possible to form the material into lumps or briquettes without the use of a temporary binder. A temporary binder is however desirable in order to keep the silicon carbide in lump form until it reaches the slag zone of the cupola. The bonding should be such that the briquette will withstand movement with the charge, but any bonding which will prevent disintegration in the slag zone is to be avoided. A temporary binder such as "Glutrin" or "Lignone", which materials are adhesives made from cellulose sulphite liquor, and are obtained as bi-products in the chemical digestion of paper pulp, has been found to fulfil the required conditions, and can be used in a proportion of about one and one-half per cent. "Glutrin" and "Lignone" are trade names for cellulose sulphite pitch. I may also use a tar or pitch binder and briquette the material in a manner similar to the briquetting of coal. Another desirable procedure comprises forming the briquette, preferably with a temporary binder, and dipping the formed briquette into a slip or slurry of Portland cement, or into a solution of sodium silicate. Briquettes of this type can be made impervious to weather, and they present a strong outer shell or crust so as to prevent crumbling during movement of the charge, and at the same time the greater proportion of the briquette is soft and the entire mass can be readily disintegrated upon coming in contact with the molten slag.

The amount of silicon carbide added will depend to some extent upon the type of iron to be melted, the temperature that is desired in the metal bath, and the properties required in the finished castings. I have found that an addition of fifteen to twenty pounds of silicon carbide per ton of metal is very satisfactory under most conditions. When a high grade scrap is used the amount of silicon carbide can be somewhat reduced, and a very beneficial effect can often be produced by the addition of only seven or eight pounds of silicon carbide per ton of metal. With low grade scap such as the type of scrap ordinarily designated in the trade as "stove plate" scrap, a larger amount of silicon carbide should be used. I have found that in such instances from twenty to twenty-five pounds of silicon carbide per ton of metal will produce satisfactory castings.

In carrying out the melting process, the cupola can be operated in the usual manner, except that it may be desirable to reduce the coke ratio in the charge, in order to utilize the high pouring temperature produced by the addition of silicon carbide without increasing the sulphur content of the iron, as would be the case if a high coke ratio were used. As an example of a satisfactory coke ratio, I have found that in a cupola normally operating with a ratio of one part of coke to ten parts of metal, this ratio can be decreased to one part of coke to thirteen parts of metal with the addition of approximately fifteen pounds of silicon carbide per ton of metal in the charge. Where higher pouring temperatures are desired, the normal coke ratio can be maintained and the silicon carbide used to further increase the temperature.

In operating the cupola, it is desirable to maintain a substantial volume of slag in order to facilitate the solution of the silicon carbide. I have found that with a slag in which the components are preponderantly acid, the solution of silicon carbide is somewhat difficult, but if the composition of the slag is adjusted so that it contains a substantial percentage of basic ingredients, solution of the silicon carbide in the molten bath can be readily effected. A very simple method of maintaining a slag suitable for the dissolution of the silicon carbide lumps or briquettes is to add limestone to the charge. In starting the cupola, a layer of limestone can be placed directly above the coke bed and occasional additions of limestone can be made during the subsequent charging of the cupola. I have found that about fifty pounds of limestone per one thousand pounds of metal will produce satisfactory slagging conditions.

A slag satisfactory for the disintegration of the silicon carbide briquettes may have the following approximate analysis:

| | Per cent |
|---|---|
| $SiO_2$ | 52 |
| $FeO$ | 6 |
| $Al_2O_3$ | 8 |
| $CaO$ | 27 |
| $MgO$ | 5 |
| $MnO$ | 2 |

Other basic materials such as dolomite and magnesite can also be used to provide a proper content of basic oxides in the slag.

The silicon carbide can be distributed through the metal charge, or can be scattered over the layer of limestone placed above the coke. This latter procedure is very desirable, since the dissolution of the silicon carbide takes place in the slag zone, and the metal must pass through the slag during its downward passage through the cupola.

A satisfactory method of operating the cupola comprises laying the coke bed, charging the limestone directly over the coke, scattering about fifteen pounds of silicon carbide in briquetted form over the top surface of the limestone, charging the scrap iron, and then repeating the process with subsequent charges, using first coke and then limestone followed by the silicon carbide and the charge of metal.

I have found it advantageous to add the silicon carbide directly to the charge in the cupola because solution of silicon carbide in the melt is more readily effected than when the addition is made to the metal in the ladle. I have found, however, that in certain instances beneficial effects can be obtained by adding silicon carbide directly to the ladle. In making such additions, I prefer to use the material in briquetted form, for if loose silicon carbide is added to the ladle, the silicon carbide grains float on the surface of the metal or the slag and do not readily dissolve in the molten bath. If desired, the silicon carbide can be introduced below the surface of the metal by means of a small inverted perforated crucible or container forced below the surface of the melt.

In operating the cupola, it is desirable to attain fairly high temperatures in order to secure the beneficial effects of silicon carbide addition, as reaction and solution in the iron may not take place at extremely low cupola temperatures. Operating conditions which will produce a pouring temperature of from 2650° F. to 2750° F. have been found to produce a very satisfactory reaction. In one typical example, the pouring temperature without the addition of silicon carbide was about 2680° F. whereas with the addition of fifteen pounds per tone of silicon carbide, this temperature was increased to 2750° F. I have attained fairly satisfactory results, however, with pouring temperatures as low as from 2500° F. to 2600° F., using a high percentage of stove-plate scrap.

The addition of silicon carbide when added in the proportion of about fifteen pounds per ton of metal usually produces an increase in pouring temperature of from approximately 75° F. to 100° F. over that which obtains under similar conditions when no silicon carbide is added. The increase in pouring temperature afforded by the use of silicon carbide is a factor of great importance in cupola melting. In a cupola used for melting cast iron the temperature can not be controlled directly except by the addition of more coke and by the holding of the iron in the cupola for a longer period of time, and these procedures inevitably cause an increase in the sulphur content of the material due to the absorption of sulphur from the coke. With most scrap mixes, the sulphur content approaches very closely the critical percentage where a further increase will produce unsatisfactory castings, so that a means for increasing the pouring temperature and the fluidity of the metal without increasing the sulphur is of very great importance. With the use of silicon carbide, the pouring temperature can be increased and at the same time the coke ratio can be decreased rather than increased.

A very slight increase in the sulphur absorbed from the coke can make a great difference in the structure and properties of the resulting iron. The relative proportions of free and combined carbon in cast iron are to a large extent dependent upon the silicon and sulphur contents of the metal. Silicon facilitates the decomposition of iron carbide or cemetite, the principal constituent of white iron, whereas sulphur retards such decomposition. In ordinary grey iron silicon is a necessary ingredient, whereas the presence of sulphur in any appreciable quantity is highly undesirable. In the remelting of scrap iron, the silicon and carbon are partially removed by oxidation, but the addition of sulphur is cumulative, and a further increase results from the sulphur contained in the coke. I have found that under such conditions the addition of silicon carbide greatly increases the machinability of the castings, and the amount of silicon and carbon absorbed as a result of the silicon carbide addition is also beneficial in producing a high degree of machinability. With the addition of silicon carbide I have found it possible to remelt mixtures containing one hundred per cent low grade scrap and to secure metal having excellent machining properties.

In the manufacture of grey iron castings from scrap iron in accordance with the usual cupola practice, it has heretofore been necessary to mix a certain percentage of pig iron with the scrap in order to obtain proper physical properties in the resulting castings. The proportion of pig iron required has been somewhat variable, depending upon the nature of the scrap, but the amount used is usually from about thirty-five to fifty per cent. If the remelting of a mixture of one hundred per cent scrap is attempted, the resulting castings are unsatisfactory. The iron obtained is extremely hard and unmachinable; the shrinkage is very high, and the casting usually contains a network of undecomposed carbide which renders the material unsatisfactory for most purposes for which grey iron is intended. In some cases, as for example, when the charge consists entirely of low grade scrap such as that commonly designated as "stove plate" scrap, the metal when cast may consist entirely of white iron. The difficulties heretofore encountered in melting a mixture comprising one hundred per cent scrap have made the melting of such a mixture by the ordinary cupola procedure entirely impracticable. With the addition of silicon carbide as above described, these conditions are entirely altered. Even when the charge consists of one hundred per cent scrap, the cast metal possesses a high degree of machinability, and can be cast into thin sections without warping and breakage.

One of the characteristics of metal made with the addition of silicon carbide is a relatively uniform fracture even in comparatively large sections. There is practically no tendency to form a chill edge and there is very little, if any, refinement of the grain at the edge of the casting in comparison with that at the interior portions. This uniformity is an important characteristic when castings having a considerable variation in cross section are to be made.

The microstructure of the material to which silicon carbide has been added also differs from the usual grey iron castings containing no silicon carbide additions. This is especially the case when high scrap mixes are used. The iron consists of graphite flakes embedded in a matrix which is almost entirely pearlitic. The pearlitic structure of the iron is stabilized over widely varying rates of cooling. For example, in a casting having a relatively small cross section, there is very little chill and the iron is almost entirely pearlitic except for the usual undissolved constituents, such as graphite, iron phosphide eutectic and possibly some excess carbide over the pearlitic ratio. When a mix made from the same material is cast into a block or heavy section, the structure is substantially the same as that in the thinner section except for a possible coarsening of the pearlite and of the phosphide eutectic, graphite and other undissolved constituents. When a mix is made entirely from scrap iron and silicon carbide is added to the charge, a microscopic examination shows that the metal is pearlitic and is almost entirely devoid of free ferrite.

This stabilized structure is not characteristic of the usual grey iron castings, which in very thin sections are often characterized by a substantial chill, so that an excess of iron carbide over a pearlitic ratio is present, and in thick sections, a considerable amount of free ferrite is invariably present as a result of the greater decomposition of the iron carbide with a very slow rate of cooling.

Although by the use of silicon carbide I am able to produce a casting having a lower sulphur content than that which could be obtained with the same pouring temperature if no silicon carbide were added, I have also found that the addition of silicon carbide to the molten metal possesses some counter active effect upon the sulphur present in the iron. With ordinary grey iron a sulphur content of greater than .10% is undesirable, and when the percentage of sulphur appreciably exceeds this value, the castings become hard and are difficult to machine. Difficulty is also encountered with warpage and breakage of thin sections, especially where reheating is necessary, as is the case in enamelling. When silicon carbide is added to the metal, I have found that the sulphur content of the metal can be increased to a value as high as from .13% to .16% without seriously impairing the machining qualities or causing damage from warping and breaking. I do not know the exact nature of this effect. I have observed under the microscope that the iron to which silicon carbide is added contains manganese sulphide in the form of well developed crystals and it is possible that the higher pouring temperatures attained with the addition of silicon carbide may have some effect upon the removal of sulphur which would otherwise be dissolved in the iron carbide by causing the separation of this sulphur as a separate crystal phase combined with the manganese. The portion of the sulphur which prevents the decomposition of the iron carbide in high sulphur irons probably remains dissolved in the carbide itself, and may not be present as manganese sulphide.

The addition of silicon carbide is of particular advantage in the case of cast iron which is to be used for enamelling. The production of a satisfactory grade of cast iron for enamelling purposes is a matter of considerable difficulty, and in making up a charge for the cupola, it is customary to use a fairly good grade of scrap and add a substantial quantity of pig iron. Even with a charge of this composition, there is considerable difficulty from warping and breakage. As is well known in the enamelling of cast iron, warping and breakage of thin sections is an almost continuous source of trouble. The addition of silicon carbide overcomes these difficulties, and I have also found it possible to produce a better grade of iron for enamelling with the use of 100% scrap than was heretofore attained in using mixture containing approximately 35% pig iron. A satisfactory mixture for operating under these conditions comprises 50% cylinder block scrap, and 50% No. 1 cupola cast scrap. Material can be charged into the cupola and the silicon carbide added as above described. With a proper pouring temperature the metal made in this manner can be cast into relatively thin sections and the difficulties encountered from warpage and breakage can be either minimized or entirely eliminated. The higher pouring temperature also facilitates the casting of thin sections such as are required in the manufacture of enamel ware.

A cast iron for enamelling which would ordinarily contain about 3.15% total carbon, from 1.90% to 2% silicon, and approximately .12% sulphur has been found to be greatly improved by the addition of silicon carbide. In such an iron the carbon and silicon contents are somewhat low, whereas the sulphur content is high. An iron of this approximate analysis, which is often encountered in enamelling work, represents a critical condition where difficulties are often encountered, and where a small variation in analysis or cooling rate may produce unsatisfactory castings. With the addition of silicon carbide, the total carbon can be increased to about 3.35%, which is well above the minimum carbon content where difficulties are encountered, and the effect of the high sulphur and low silicon and carbon which would ordinarily obtain can be counteracted to such a degree that losses from warping and breakage are greatly reduced.

The graphite distribution obtained with the iron to which silicon carbide has been added is also favorable for enamelling. In thin sections, there is a tendency toward refinement of the graphite and spheroidization at the extreme edge. The stability of the structure upon reheating is also an important factor in securing a satisfactory coat of enamel without warping of the casting or blistering of the enamel.

In the production of castings by the procedure above described, an important advantage offered by the heat of reaction of the silicon carbide is that it tends to make the metal more fluid, so that the height of the risers can be appreciably reduced. I have found that a very substantial saving in casting scrap can thus be effected. The metal is also "live", and does not "set" in the ladle or crucible to the same extent as ordinary cast iron.

Another important application of the addition of silicon carbide to cast iron consists in salvaging the early part of a cupola run which would otherwise be too cold to pour into castings. In the operation of the cupola, the temperature increases with repeated charging, and it is often necessary to scrap the early part of the run because considerable time is required to reach the proper pouring temperature. When such difficulties are encountered, the addition of silicon carbide to the earlier charges decreases the amount of metal which must be run into pigs before casting, and with some cupolas these additions will eliminate the necessity of scrapping the early part of the run.

In iron where the silicon and carbon contents are abnormally low or are substantially reduced upon remelting, the content of these elements can be increased to that desired for grey iron by the addition of silicon carbide. Badly oxidized metal or charges containing substantial proportions of steel can be remelted and the silicon and carbon contents increased so that the iron when cast will contain from 3.0 to about 3.65 carbon and will have a silicon content of approximately 2 per cent or greater. Silicon carbide additions can also be made to advantage in the case of the so-called "high test" iron, where the carbon content is considerably lower than that ordinarily encountered in the usual grey iron castings. In the production of "semi-steel" castings or other castings from iron low in total carbon, the temperature range where the iron becomes "pasty" or sets is considerably greater than with high carbon irons, and the thermal reaction produced by silicon carbide is of advantage in preventing the setting of the iron during the pouring of the castings.

In referring to the enamelling of iron, I of course mean the application of a vitreous coating as distinguished from the so-called "enamels" or paints which do not require reheating or vitrification. Within the scope of the term "iron" I include materials having the impurities or alloying ingredients ordinarily encountered in the production of cast iron castings.

Having thus described my invention, I claim:

1. The step in the process of remelting iron and forming castings therefrom, which comprises bringing silicon carbide into contact with the molten iron in the presence of a substantial quantity of slag.

2. The step in the process of remelting iron and forming castings therefrom, which comprises bringing silicon carbide into contact with the molten iron in the presence of a slag containing a substantial proportion of basic ingredients.

3. The method of remelting iron to form castings therefrom, which comprises introducing into a cupola a charge of coke, iron, silicon carbide and a sufficient quantity of slag forming material to maintain a substantial volume of slag in the cupola, and melting the fusible ingredients in the charge by the combustion of the coke.

4. The method of remelting iron to form castings therefrom, which comprises introducing into a cupola a charge of coke, iron, a basic slag forming ingredient and silicon carbide, melting the iron in the charge by the combustion of the coke, and causing the molten iron to come in contact with the silicon carbide in the slag zone of the cupola.

5. The method of remelting iron in a cupola which comprises forming a bed of coke in the cupola, positioning above the coke a quantity of a basic slag forming ingredient, and adding a charge of silicon carbide and iron.

6. In the melting of cast iron in a cupola, the steps which comprise adding silicon carbide and limestone to the charge.

7. The method of remelting iron to form castings therefrom, which comprises forming a charge consisting principally of coke and iron in which more than 75 per cent of the iron consists of cast iron scrap, adding a basic slag forming ingredient and a minor proportion of silicon carbide to the charge and melting the iron in the charge by combustion of the coke.

8. The method of remelting iron to form castings therefrom, which comprises forming a charge consisting principally of coke and iron in which substantially all of the iron consists of cast iron scrap, adding a basic slag forming ingredient and a minor proportion of silicon carbide to the charge and melting the iron in the charge by combustion of the coke.

9. The steps in the process of making enamelled cast iron, which comprise melting the iron in a cupola, introducing silicon carbide into the iron, pouring the iron into castings and subsequently applying a coating of vitreous enamel to the castings.

10. The method of making enamelled cast iron which comprises melting in a cupola a charge in which the metal is substantially all scrap iron, adding silicon carbide and a basic slag forming ingredient to the charge prior to the melting of the iron, pouring the iron into castings and subsequently applying a coating of vitreous enamel to the castings.

WILLIAM A. BROWN.